US010635570B2

(12) United States Patent
Gahlin et al.

(10) Patent No.: US 10,635,570 B2
(45) Date of Patent: Apr. 28, 2020

(54) MEMORY LEAK PROFILING EVENTS

(71) Applicant: Oracle International Corporation, Redwood Shores, CA (US)

(72) Inventors: Erik Kristofer Gahlin, Stockholm (SE); Marcus Mattias Hirt, Rigi (CH)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/008,725

(22) Filed: Jun. 14, 2018

(65) Prior Publication Data

US 2019/0102278 A1    Apr. 4, 2019

Related U.S. Application Data

(60) Provisional application No. 62/565,957, filed on Sep. 29, 2017.

(51) Int. Cl.
*G06F 9/44* (2018.01)
*G06F 11/36* (2006.01)
*G06F 12/06* (2006.01)
*G06F 12/02* (2006.01)
*G06F 11/34* (2006.01)

(52) U.S. Cl.
CPC ........ *G06F 11/364* (2013.01); *G06F 11/3466* (2013.01); *G06F 11/3636* (2013.01); *G06F 12/0253* (2013.01); *G06F 12/0646* (2013.01); *G06F 2212/1016* (2013.01); *G06F 2212/1044* (2013.01)

(58) Field of Classification Search
CPC . G06F 11/364; G06F 11/3466; G06F 11/3636

USPC ...................................................... 717/128
See application file for complete search history.

(56) References Cited

U.S. PATENT DOCUMENTS

2005/0066329 A1* 3/2005 Fischer ............... G06F 11/3419
   718/100
2005/0114844 A1* 5/2005 Betancourt ......... G06F 11/3636
   717/128

(Continued)

OTHER PUBLICATIONS

Title: Reconsidering custom memory allocation; author:: ED Berger et al, publisehd on 2002.*

(Continued)

*Primary Examiner* — Chameli Das
(74) *Attorney, Agent, or Firm* — Invoke

(57) ABSTRACT

Techniques for profiling memory leaks are described. In one or more embodiments, a memory profiling system identifies a set of one or more objects on the heap during application runtime. For each respective object in the subset of objects, the memory profiling system stores a set of sample information including timestamp that identifies a time associated with an allocation on the heap memory was performed for the respective object and a stack trace identifying at least one subroutine that triggered the allocation on the heap memory. Responsive to detecting a memory leak, the memory profiling system generates a memory leak profile for at least one object in the subset of objects that is causing the memory leak. The memory leak profile identifies when the allocation on the memory store for the at least one object was performed and information about object that remained live after the potential memory leak.

20 Claims, 10 Drawing Sheets

(56) References Cited

U.S. PATENT DOCUMENTS

| | | | | |
|---|---|---|---|---|
| 2006/0143395 A1* | 6/2006 | Zohar | ............... | G06F 12/126 |
| | | | | 711/133 |
| 2009/0007075 A1* | 1/2009 | Edmark | ............ | G06F 11/3612 |
| | | | | 717/128 |
| 2009/0037660 A1* | 2/2009 | Fairhurst | ............ | G06F 12/126 |
| | | | | 711/129 |
| 2009/0328007 A1* | 12/2009 | Chen | ............... | G06F 11/3636 |
| | | | | 717/128 |
| 2011/0286420 A1* | 11/2011 | Cho | ............... | H04W 74/004 |
| | | | | 370/329 |
| 2013/0332909 A1* | 12/2013 | Odaira | ............ | G06F 8/24 |
| | | | | 717/128 |
| 2014/0195818 A1* | 7/2014 | Neumann | ......... | G06F 21/6209 |
| | | | | 713/189 |
| 2015/0365941 A1* | 12/2015 | Liu | ............... | H04W 72/0446 |
| | | | | 370/280 |
| 2016/0179580 A1* | 6/2016 | Benedict | ............ | G06F 9/5016 |
| | | | | 718/104 |
| 2018/0074854 A1* | 3/2018 | Chan | ............... | G06F 11/3612 |
| 2018/0335968 A1* | 11/2018 | Pauley | ............... | G06F 3/068 |

OTHER PUBLICATIONS

Title: Understanding memory allocation of Scheme programs author: M Serrano published on 2000.*

Title: Detecting and eliminating memory leaks using cyclic memory allocation, author: JJ Nguyen et al, published on 2007.*

* cited by examiner

| Timeline | | S1 | S2 | S3 | S4 | Comment |
|---|---|---|---|---|---|---|
| T0 | Program start | - | - | - | - | No objects in the queue. |
| T1 | Object A allocated in TLAB-1 (192 kb) | 192 kb, A<br>Before: -<br>After: - | - | - | - | New object is placed first in queue. TLAB size determines allocation span |
| T2 | Object B allocated in TLAB-2 (64 kb) | 192 kb, A<br>Before: B<br>After: | 64 kb, B<br>Before:<br>After: A | - | - | Object B covers less allocation span and gets lower priority than A. |
| T3 | Object C allocated directly on the heap (100 kb) | 192 kb, A<br>Before: B<br>After: | 100 kb, C<br>Before:<br>After: B | 64 kb, B<br>Before: C<br>After: A | - | Object C can't fit TLAB and object size determines allocation span. |
| T4 | Garbage Collection G1 occurs, object C lacks references and is removed | 192 kb, A<br>Before: B<br>After: | 164 kb, B<br>Before:<br>After: A | - | - | Object C spreads allocation span to B, its only neighbor. |
| T5 | Object D allocated in TLAB-3 (96 kb) | 192 kb, A<br>Before: B<br>After: - | 164 kb, B<br>Before: D<br>After: A | 96 kb, D<br>Before: -<br>After: B | - | Object D has least allocation span and receives lowest priority |
| T6 | Object E allocated in TLAB-4 (96 kb) | 192 kb, A<br>Before: B<br>After: - | 164 kb, B<br>Before: D<br>After: A | 96 kb, D<br>Before: E<br>After: B | 96 kb, E<br>Before: -<br>After: D | Object E was allocated after D (same size) and gets lower priority. |
| T7 | Object F allocated directly on the heap (73 kb) | 192 kb, A<br>Before: B<br>After: - | 164 kb, B<br>Before: D<br>After: A | 96 kb, D<br>Before: E<br>After: B | 96 kb, E<br>Before: -<br>After: D | Queue is full, but F has less allocation span than all objects in queue and is not inserted. |
| T8 | Object G allocated in TLAB-5 (64 kb) | 192 kb, A<br>Before: B<br>After: - | 192 kb, D<br>Before: G<br>After: B | 164 kb, B<br>Before: D<br>After: A | 136 kb, G<br>Before: -<br>After: D | Queue is full again. E removed and distributes allocation span to D. G gets span from F. 64+72 = 136 |
| T9 | Garbage collection G2 occurs, D and G are no longer reachable and are removed | 492 kb, B<br>Before:<br>After: A | 192 kb, A<br>Before: B<br>After: | - | - | D gives span to G and B. G then gives to B. B passes A in priority. |
| T10 | Out of memory when object H can't find space on the heap. Program exits and queue contains leaking instances. | 492 kb, B<br>Before: -<br>After: A | 192 kb, A<br>Before: B<br>After: - | - | - | Left is static object A and memory leak B. Memory leak B was lost in T8 because of a too small queue size. |

FIG. 4

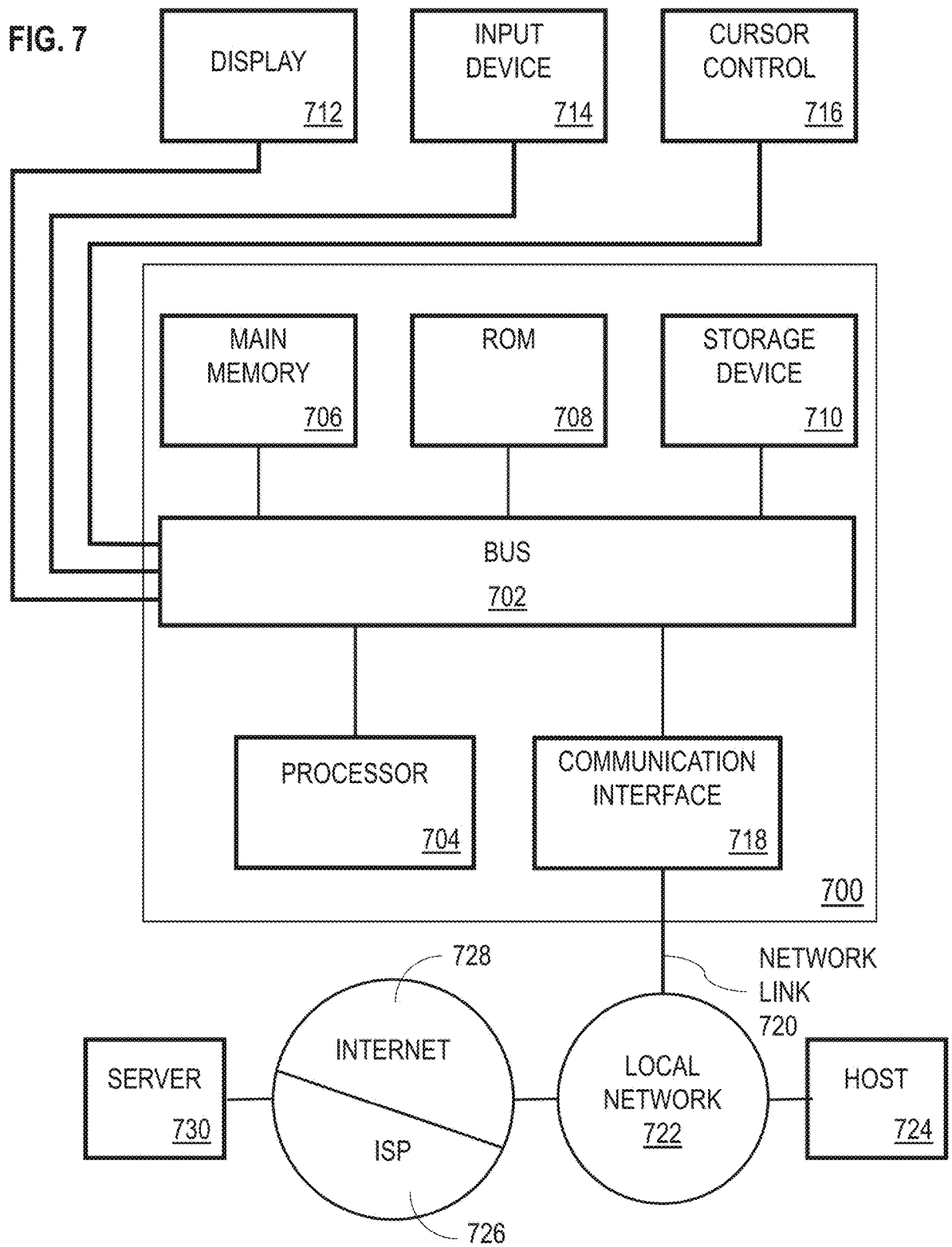

MEMORY LEAK PROFILING EVENTS

BENEFIT CLAIMS; RELATED APPLICATIONS; INCORPORATION BY REFERENCE

This application claims the benefit of U.S. Provisional Patent Application 62/565,957, filed Sep. 29, 2017, which is hereby incorporated by reference.

TECHNICAL FIELD

The present disclosure relates to performance profilers and optimizers. In particular, the present disclosure relates to detecting and remediating memory leaks in computing systems.

BACKGROUND

Many programming languages support dynamic memory allocation, where memory is allocated and deallocated during program execution. This approach alleviates the need to allocate memory upfront during program compilation, when the amount of memory required by the program may not be known. Memory may instead be allocated and de-allocated during program execution based on runtime demands.

Dynamic memory allocation may lead to memory errors if not properly managed. One example of a memory error is referred to as a dangling pointer. This type of memory error occurs when memory space has been freed by an operating system, but pointers to the memory location are not dereferenced by the program. If the program attempts to access the memory location via the dangling pointer, then unpredictable program behavior may result. In some cases, the memory may have been allocated to another program, which may cause the operating system to throw a fault. In other cases, the memory location may contain different data than expected, leading to data corruption.

Memory leaks are another type of error that may occur if memory allocation is not properly managed. This type of memory error occurs when an object that is no longer used by a program is not freed. For example, a program may put an object into a hash table but omit code to properly remove the object. As a result, the object may remain in memory indefinitely during program runtime, wasting memory space. Small memory leaks may not lead to significant problems. However, memory leaks may accumulate over the running life of an application. As the amount of memory that is allocated to a program is finite, large memory leaks may cause significant performance degradation and program crashes.

Some programming languages integrate garbage collection to prevent or mitigate memory errors such as dangling pointers and memory leaks. Garbage collection involves the reclamation of memory occupied by objects that are no longer in use by a program. Garbage collection is often effective at preventing dangling pointers. However, garbage collection generally does not guarantee that a program will not experience memory leaks. The reason is that garbage collectors are typically limited to reclaiming objects that are no longer accessible to the program. Thus, the garbage collector may not remove objects that are still accessible to the program, even if these objects are no longer used. As a result, memory leaks may still cause performance degradation and crashes, even in runtime environments with garbage collection.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example time progression of a queue that tracks objects on the heap during program runtime, in accordance with one or more embodiments;

FIG. 7 shows a block diagram that illustrates a computer system in accordance with one or more embodiments.

DETAILED DESCRIPTION

Figure 1:
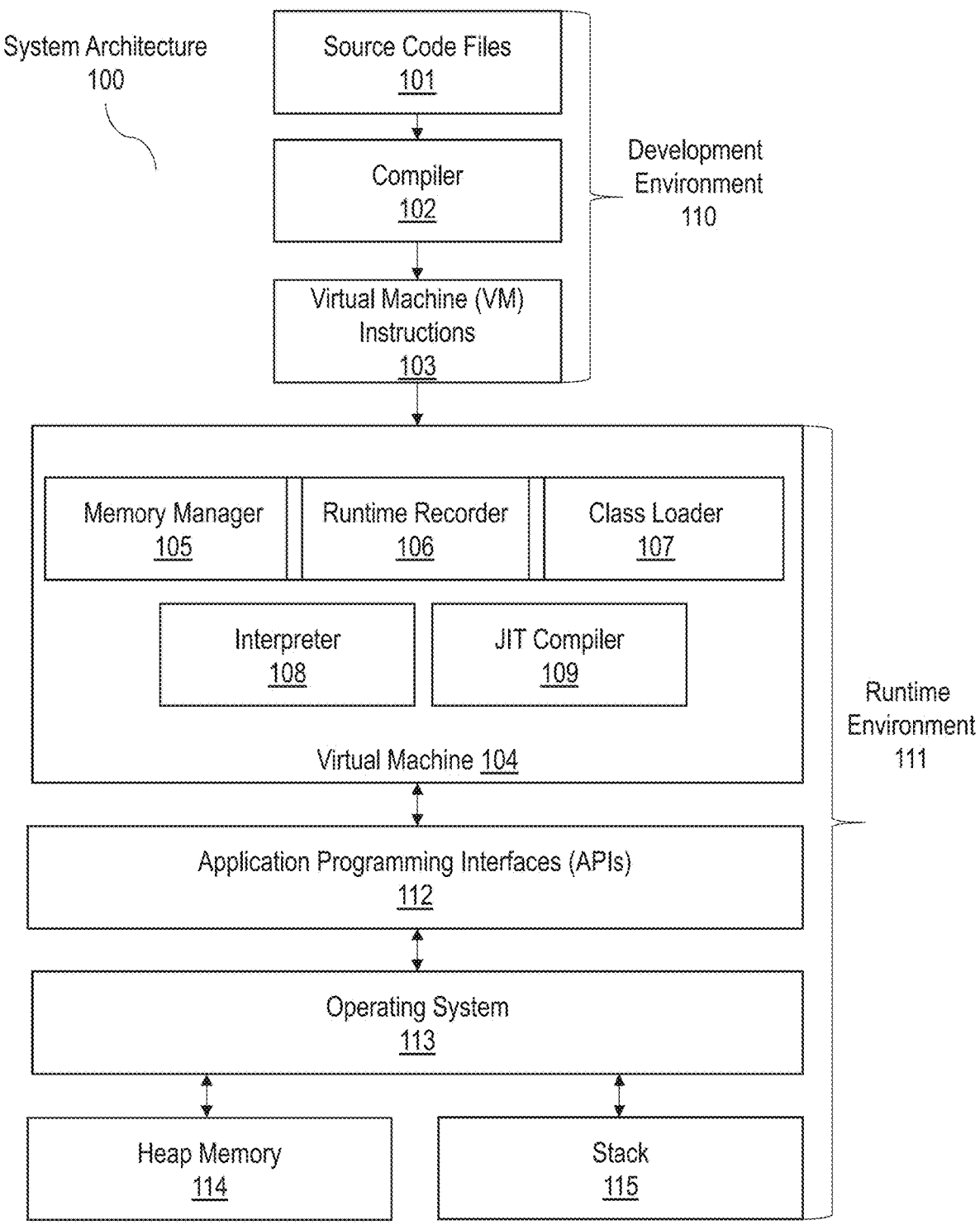
FIG. 1 illustrates a system for profiling and resolving memory leaks, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SAMPLING OBJECT ALLOCATIONS
4. TRACKING SAMPLED OBJECTS ON THE HEAP
5. PRESENTING MEMORY LEAK PROFILES
6. COMPUTER NETWORKS AND CLOUD NETWORKS

7. MICROSERVICE APPLICATIONS
8. HARDWARE OVERVIEW
9. MISCELLANEOUS; EXTENSIONS

1. General Overview

Memory leaks may pose significant challenges to application developers. If left unchecked, memory leaks may lead to performance degradation, program crashes, and data losses. One approach developers may use to resolve memory leaks is performing memory dumps of the heap (referred to herein as "heap dumps"). A heap dump is a process for capturing and/or displaying the contents currently in an area of memory referred to as the heap. The developer may sift through the heap contents in an attempt to identify the object or set of objects that are causing a memory leak.

Even with a full heap dump, a developer may struggle to locate the source of a memory leak. The amount of data stored on the heap may be significant, especially when the memory utilization is at or near capacity. As a result, a user may need to parse gigabytes or more of data to locate the source of a memory leak. In some cases, the file generated from a memory dump of a production system may be too large to be fully loaded into the memory of a development system. Thus, sifting through the contents of a heap dump may be a slow and cumbersome process.

Heap dumps also typically do not give developers any indication as to the root cause of a leak. While a heap dump gives a developer a snapshot of the heap at a particular point it time, it does not capture aging information about objects on the heap or how the objects were allocated. As a result, the developer may not readily be able to determine what source code triggered the memory leak or when in the running cycle of the program the leak occurred, even if the developer is able to identify the object that is the source of the leak.

Another disadvantage of full heap dumps is the risk of security breaches. The heap memory may include unobfuscated data, such as plain text, that is not meant to be viewed by a developer. For example, the heap may include personal identifying information or other sensitive information for one or more users of an application. In certain systems, a developer may not be permitted to perform a memory dump to comply with security policies.

Heap dumps may also involve intrusive pauses or shutdowns. Developers typically do not want objects moved around while inspecting the heap. To prevent such changes, threads may be blocked from accessing the heap until the developer's analysis is complete. This approach may result in service interruptions and performance degradation for the end users of an application.

Systems and methods are described herein for tracking and profiling objects in heap memory. The techniques may be implemented to facilitate the detection and resolution of memory leaks without the need to perform a full heap dump. The techniques track and profile a subset of objects on the heap that are potential sources of memory leaks rather than all of the objects on the heap. As a result, the overhead of generating and sifting through large amounts of data from a full heap dump may be avoided.

In one or more embodiments, a memory profiling system is configured to perform sample allocation profiling, whereby the system generates object allocation samples (also referred to herein as "object samples"). An object sample is a record that captures information about an objection allocation. Sample data for a given heap object allocation may include, but is not limited to, timing information about when the allocation occurred, a stack trace that identifies where the allocation occurred in the code, and/or object attributes identifying the object for which the allocation occurred.

In one or more embodiments, the memory profiling system is configured to constrain the amount of object samples that are tracked to a threshold. The memory profiling system may select objects to track based on a set of selection criteria, which may include, but is not limited to allocation span and allocation time. Constraining object tracking and profiling to a subset of objects keeps the overhead relatively low compared to tracking each object on the heap. The selection criteria may be tuned to target objects that are the most likely sources of memory leaks.

When sample recording is complete, the memory profiling system may output a set of profiles based on the object samples. The profiles may include interfaces and visualizations that allow users to determine when an allocation causing a memory leak occurred, which thread triggered the allocation, and which objects are involved. In addition to allocation-time information about the objects, the profile may capture information obtained at and/or after the time of the potential memory leak. This information may include, without limitation, data identifying which objects remained active/live at the time of a potential memory leak and data describing these objects.

The profiles may be used to quickly isolate and resolve the root cause of a memory leak. In one or more embodiments, the profiles are used to perform one or more remedial actions. For example, the profiles may be used to reclaim space from an object that is causing the memory leak. Additionally or alternatively, the profile may be used to isolate and modify source code to prevent leaks from occurring in the future.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, system architecture 100 includes development environment 110 and runtime environment 111. Development environment 110 includes processes, applications and other tools for creating multi-threaded applications. For example, development environment 110 may be an integrated development environment (IDE) comprising a source code editor, compiler, and debugger. A source code editor may be used to define, edit, and otherwise generate source code files 101, which may be written according to a specification directed to the convenience of the programmer.

In various embodiments, compiler 102 converts source code files 101 to virtual machine (VM) instructions 103. VM instructions 103 comprise an intermedia representation, such as bytecode, which is executable by a virtual machine. A virtual machine is a software implementation that emulates a physical machine that is capable of running within a variety of physical machine environments. A virtual machine allows VM instructions 103 to be executed on different physical machines, even if the underlying instruction set architecture (ISA) differs between the physical processors.

Source code files 101 may include code that has been written in an imperative programming language, such as Java, C, C++, C#, and so forth. Thus, source code files 101 may adhere to a particular set of syntactic and/or semantic rules for the associated language. For example, code written in Java adheres to the Java Language Specification. However, since specifications are updated and revised over time, source code files 101 may be associated with a version number indicating the revision of the specification to which the source code files 101 adhere. The exact programming language used to write source code files 101 is not critical.

VM instructions 103 are executable by a virtual machine in a more direct and efficient manner than the source code. Converting source code to virtual machine instructions includes mapping source code functionality from the language to virtual machine functionality that utilizes underlying resources, such as data structures. VM instructions 103 may include, without limitation, class files that store bytecode that may be directly loaded and executed within runtime environment 111. Often, functionality that is presented in simple terms via source code by the programmer is converted into more complex steps that map more directly to the instruction set that is loaded and executed by components of runtime environment 111.

Runtime environment 111 includes processes, application, and other tools for executing applications created through development environment 110. Runtime environment 111 generally comprises virtual machine 104, application programming interfaces (APIs) 112, operating system 113, heap memory 114, and stack 115. VM instructions 103 may be loaded and executed directly by virtual machine 104. APIs 110 enable communication between virtual machine 104 and operating system 113. Virtual machine 104 may use APIs 110 to request memory and other operating system resources be allocated for objects and other constructs during application runtime. Virtual machine 104 comprises various components, such as memory manager 105 (which may include a garbage collector), runtime recorder 106 to sample object allocation, class loader 107 to locate and build in-memory representations of classes, interpreter 108 for executing the virtual machine 104 code, and just-in-time (JIT) compiler 109 for producing optimized machine-level code.

In general, applications are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

As previously indicated, virtual machine 104 includes interpreter 108 and JIT compiler 109 (or a component implementing aspects of both), and executes programs using a combination of interpreted and compiled techniques. For example, virtual machine 104 may initially begin by interpreting the virtual machine instructions representing the program via the interpreter 108 while tracking statistics related to program behavior, such as how often different sections or blocks of code are executed by virtual machine 104. Once a block of code surpass a threshold (is "hot"), virtual machine 104 invokes JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, source code files 101 have been illustrated as the "top level" representation of the program to be executed within runtime environment 111. Although computing architecture 100 depicts the source code files 101 as a "top level" program representation, in other embodiments the source code files 101 may be an intermediate representation received via a "higher level" compiler that processed code files in a different language into the language of the source code files 101.

Compiler 102 receives as input the source code files 101 and converts source code files 101 into class files that are in a format expected by the virtual machine 104. For example, in the context of the JVM, the Java Virtual Machine Specification defines a particular class file format to which VM instructions 103 may adhere. In some embodiments, the class files contain VM instructions 103 that have been converted from the source code files 101. However, in other embodiments, the class files may contain other structures as well, such as tables identifying constant values and/or metadata related to various structures (classes, fields, methods, and so forth). In some embodiments, class files are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

Memory manager 105 processes application requests to allocate memory. Based on the requests, memory manager 106 may allocate or deallocate blocks of memory from heap memory 114. For example, an application may request memory to store a hash table, linked list, array, listener, class instance, or some other data object. In response, memory manager 106 may allocate one or more blocks from heap memory 114 to store the object. Memory manager 105 may include a garbage collector that removes objects and deallocate blocks for objects that are no longer reachable to an application. Although heap memory is referenced throughout, the techniques described herein are applicable to any memory store that is allocated to store objects during runtime.

Stack 115 is memory set aside to store information about the active subroutines (also referred to herein as functions) for a thread of execution. For example, a function (a "caller") that calls another function (the "callee") stores the return address on the stack. When the callee function is complete, the callee function retrieves and removes the return address for the caller function off the stack and returns control to the caller function using the return address. A callee function may also be a caller with respect to another function. Thus, stack 115 may capture a chain of active subroutines and their relationships such as which subroutine called another in the active chain.

Runtime recorder 106 is an event framework that records events in heap memory 114. Example events that may be recorded may include, but are not limited to, lock contention to access objects from heap memory 114, garbage collection statistics about reclaiming space from heap memory 114, and object samples that capture information about memory allocations from heap memory 114. Runtime recorder 106 may also capture the active subroutines for a thread of execution from stack 115. This information may be linked to recorded events about heap memory 114. For example, when a heap allocation is detected, the active subroutine that triggered the allocation may be recorded. Runtime recorder 106 may also maintain historical tracing data, allowing for after-the-fact analysis. During runtime execution, runtime recorder 106 may first write the recorded data to thread local buffers, promote the recorded data to global buffers, and eventually store the data to disk. Runtime recorder 106 may be turned on and off on-demand, based on pre-defined schedules, or in response to triggering events.

3. Sampling Object Allocations

In various embodiments, runtime recorder 106 may be configured to sample object allocations from heap memory 114. An object allocation sample may capture a variety of data to help detect and profile memory leaks. Example sample data captured may include, but is not limited to:
A timestamp identifying a logical and/or physical time which the allocation took place;
A stack trace identifying the active functions/subroutines during the allocation including the subroutine at the top of the stack that triggered the allocation request;
A thread identifier for the thread where the allocation occurred;
An object type associated with the object (e.g., string, listener object, hash map node, linked list node, or other types of class objects);
A size of the object;
The memory address in heap memory 114 where object is stored; and/or
Additional data about the allocation (e.g., information extracted from internal data structures associated with the object such as the name of a class object, relationships between different objects on the heap, etc.)

The above sample information may be captured at or around the time of allocation for a given object. Information that is captured at or around the time of allocation is also referred to herein as allocation-time information. As described further below, the allocation-time information may be linked with information captured much later, such as after a potential memory leak is detected and/or at the time of a recording dump. These links may be used to create one or more memory profiles, which may be used to isolate and resolve the root cause of a memory leak.

In one or more embodiments, allocation-time information for a particular object is restricted to information captured after a request to allocate memory for the object has been made but before contents are written to a memory allocated for the object. The allocation-time information may be made at the exact time the memory area is allocated, before the memory has been allocated (but after the request), or after the memory area is allocated (but before contents for the object are written to the allocated memory area).

Instrumenting every memory allocation within runtime environment 111 may be prohibitively expensive, as it would involve checking for allocations at the individual bytecode instruction level. In one or more embodiments, runtime recorder 106 is configured to sample objects allocated from thread local area buffers (TLABs). A TLAB is a buffer that is created to store objects that are local to a single thread. Objects may be allocated from one or more TLABs in heap memory 114 without the need to synchronize threads, as access is restricted to the local thread. Sample hooks may be inserted when TLABs are allocated, where the hook causes runtime recorder 106 to record sample information for each new TLAB allocation. In some cases, an object may be too large to be allocated form a TLAB. In these cases, a sample hook may be inserted when a large object/array is allocated.

Other selection criteria may also be used to determine which objects to sample. The criteria for sampling object allocations may vary from implementation to implementation. Example criteria may include, but are not limited to, allocation time (e.g., samples may be evenly distributed across allocation time), allocation span (e.g., samples may be evenly distributed based on span since last object was added to heap memory 114), object size (e.g., larger allocations may receive priority), object types (e.g., sampling may be restricted to a certain object type or set of object types), allocation method (e.g., sampling may be restricted to objects allocated in thread local area buffers) and/or any other object attribute.

Figure 2:
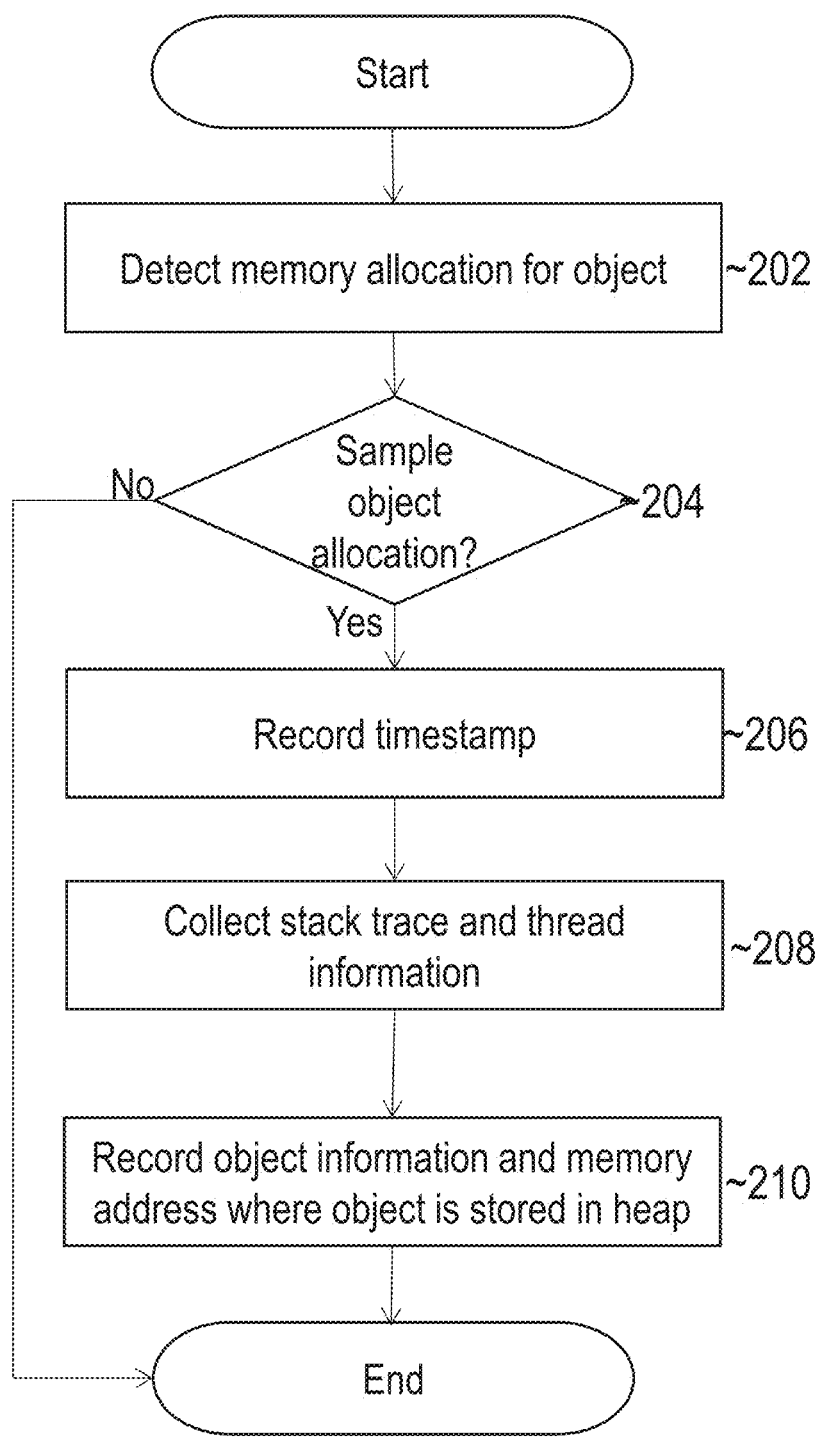
FIG. 2 illustrates an example set of operations for sampling object allocations in accordance with one or more embodiments.

FIG. 2 illustrates an example set of operations for sampling object allocations in accordance with one or more embodiments. The set of operations includes detecting a new memory allocation for an object from heap memory 114 (Operation 202). For example, the memory allocation may be performed in response to a request from a particular thread to create an object, such as a hash map, a hash map node, an array, an array entry, a linked list, a linked list node, a listener, a class object, etc.

The set of operations further comprises determining whether to sample the object allocation (Operation 204). As previously indicated, instrumenting every allocation may be prohibitively expensive. Thus, samples may be limited based on one or more of the criteria previously listed. For example, sampling may be limited to object allocations from TLABs, object bigger than a threshold size, objects matching a particular object type, and/or one or more other criteria. The criteria may be configurable by an end user to track object allocations that are of interest. If the process determines that a sample should not be taken, then the process may end without sampling the object allocation. Otherwise, the process may proceed with the operations described below.

Responsive to determining that the objection allocation should be sampled, runtime recorder 106 records a timestamp that identifies the time of the allocation (Operation 206). The timestamp that is recorded may indicate the date and time (e.g., hour, minute, second) for the allocation and/or a time relative to other allocations.

Runtime recorder 106 further collects a stack trace and thread information for the thread that triggered the allocation (Operation 208). To collect the stack trace, runtime recorder 106 may read the contents of the stack that is associated with the allocating thread. The stack trace may capture the active subroutines at the time of the allocation (e.g., the same time captured by the allocation timestamp). The active subroutines may identify the most recently active function/instruction that triggered the allocation and the chain of function calls that led to the triggered allocation. Additional thread information, such as a thread name and/or any other thread identifier, may also be captured and recorded during this operation.

Runtime recorder 106 further records object information and a memory address where the object is stored in heap memory 114 (Operation 210). Example object information may include, but is not limited to, an object name, an object type, an object size, and one or more other attributes defining the object. Object information, such as the type of object for which memory is allocated, may be determined from the stack trace. For example, active subroutine may indicate whether the allocation is for a new string, class object, hash map node etc. Other object information may be identified from internal object structures. For instance, an object header may identify an object name and size, among other attributes.

Runtime recorder 106 may store the sample information, including the allocation timestamp, stack trace, and object metadata, in a sample record. The sample record may be stored in volatile and/or non-volatile storage. In one or more embodiments, runtime recorder 106 first writes the sample record to a TLAB, which may be the same TLAB. Subsequently, runtime recorder 106 may write the sample record to a global buffer and/or non-volatile storage such as disk. The structure of the record may vary from implementation to implementation. For example, the sample record may be stored as a list, table, tree, or any other data structure.

In one or more embodiments, data within an object that is potentially sensitive is not captured as part of a sample. For example, runtime recorder 106 may be restricted or otherwise prevented from recording the data payload of a string or other object that is stored in heap memory 114. This policy allows runtime recorder 106 to capture information about an object allocation that is useful to isolate and resolve a memory leak without compromising potentially sensitive data stored by the object.

4. Tracking Sampled Objects on the Heap

Once a sample has been taken for a given object stored to heap memory 114, the object may be tracked over time. Changes to the object may be captured and factored in to a memory leak profile. For example, if a garbage collector removes the object from the heap, then the object is not a potential source of a memory leak and tracking for the object may stop.

Overhead may be reduced by limiting the number of objects on the heap that are tracked. For example, the number of objects that are tracked may be constrained to a threshold. If the constraint threshold is exceeded, then tracking may be ended for one or more of the sampled objects.

In one or more embodiments, the subset of objects to track are selected based on a set of priority criteria. Example priority criteria may be include one or more sample criteria identified above and may include, but is not limited to, allocation time (e.g., object tracking may be evenly distributed across allocation time), allocation span (e.g., tracking may be evenly distributed based on span since last object was added to heap memory 114), object size (e.g., larger allocations may receive priority), object types (e.g., certain types of objects may receive priority), and/or other object attributes In one or more embodiments, a priority queue is maintained to identify which objects should be tracked within heap memory 114. The priority queue may be configured to store a threshold number of items, where each item represents a separate object and is ordered according to priority. Priority may be determined based on one or more criteria specified above. For example, priority may be the allocation span since the last inserted object. Objects that span the least amount of memory are assigned the lowest priority and replaced or otherwise removed first. In other cases, priority may be based on the time since the last inserted object. This approach allows samples to be evenly distributed over time. However, there may be periods of downtime where user activity and allocations are very low. Thus, an even distribution over allocation may be more effective for finding memory leaks.

In addition or as an alternative to the priority queue, the sampled object may be tracked using a data structure ordered by time. For example, items may be maintained in a linked list or similar data structure with nodes ordered based on allocation time. In this scenario, the list may start with the object that was first allocated (i.e., the oldest sampled object on the heap) and continue in order of allocation time with the last node in the list corresponding to the most recently allocated object. The linked list allows a timeline of sampled objects to be quickly determined and constructed. The timeline may be displayed as part of an interactive memory profile, as described in further detail below.

Figure 3A:
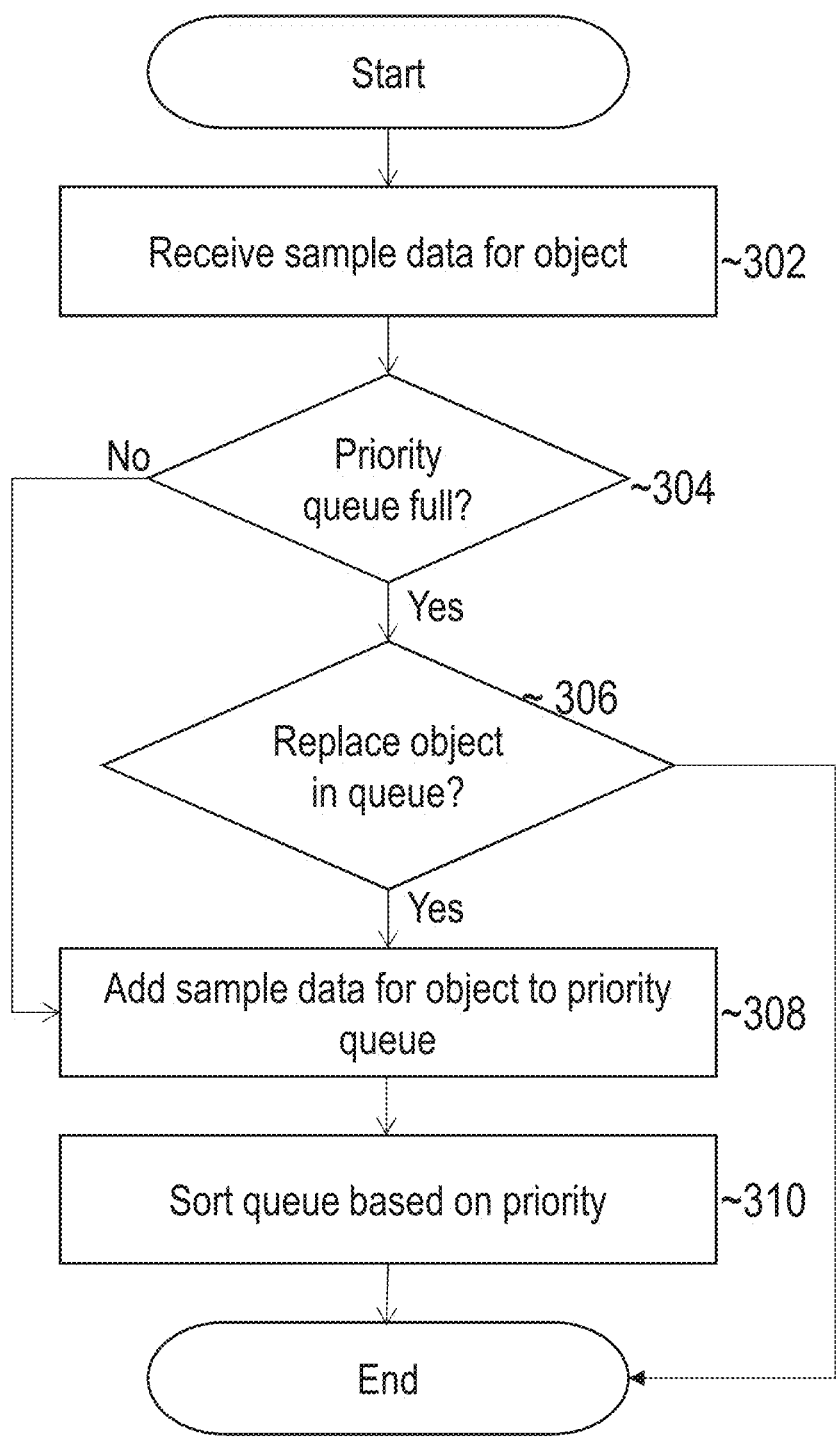
FIG. 3A illustrates an example set of operations for tracking a subset of objects on the heap during program runtime, in accordance with one or more embodiments.

FIG. 3A illustrates an example set of operations for tracking a subset of objects on the heap during program runtime, in accordance with one or more embodiments. The set of operations includes receiving sample record for an object (Operation 302). The sample record may include any combination of sample data previously mentioned for a recently detected/new allocation from heap memory 114.

Responsive to receiving the sample record, the process determines whether the priority queue is full (Operation 304). At the beginning of a runtime recording, the number of sampled objects may not exceed the threshold. As the recording time lapses, however, the number of objects being tracked may eventually fill the priority queue. If the priority queue is not full then the process jumps to operation 308 to add the new object sample to the queue. Otherwise, the process continues to operation 306.

If the priority queue is full, then the process determines whether to replace an object in the queue (Operation 306). If the object has a higher priority than other objects on the heap, then the lower priority item in the queue may be removed. On the other hand, if the object has a lower priority than any of the items in the queue, then the sample record for the object is not added to the priority queue. In the context where allocation is used to measure priority, for instance, the new object sample may be added if and only if the allocation span is larger than at least one other item in the queue.

Responsive to determining that the queue is not full or that an item should be replaced, the sample record for the new object is added to the priority queue (Operation 308). For example, this operation may include adding a new node to a linked list or replacing a node in the linked list with a node representing the newly added object.

After the object sample has been added, the priority queue is sorted to order items by priority (Operation 310). For example, the priority may be sorted based on allocation span, allocation time, and/or any other of the priority criteria previously listed.

In some cases, a garbage collector may remove objects that are tracked by a priority queue. This event may occur when the object is no longer reachable by the program. In these cases, the priority queue may be updated to reflect changes to heap memory 114.

Figure 3B:
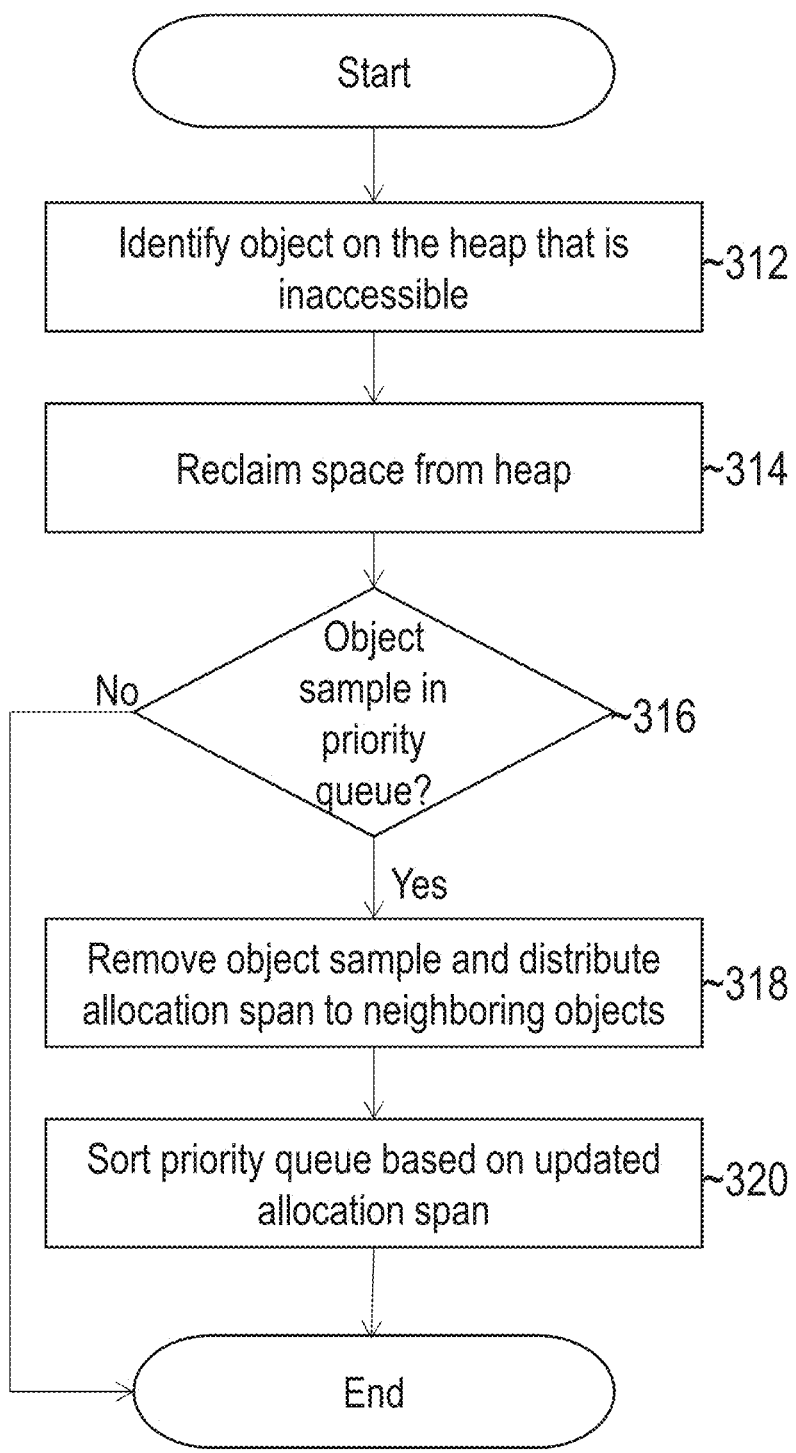
FIG. 3B illustrates an example set of operations for updating the subset of objects that are tracked responsive to a garbage collection event, in accordance with one or more embodiments.

FIG. 3B illustrates an example set of operations for updating the subset of objects that are tracked responsive to a garbage collection event, in accordance with one or more embodiments. During garbage collection, an object on the heap is identified that is inaccessible (Operation 312). A garbage collector may determine which objects are inaccessible by maintaining a chain of references from a set of root objects. Example garbage collection roots may include, but are not limited to, active threads and classes loaded by class loader 107. The garbage collector may trace objects through the maintained chain of references back to the roots. If an object does not lead back to a garbage collection root, then the garbage collector may classify the object as inaccessible.

Responsive to identifying an object that is inaccessible, the garbage collector reclaims the memory space occupied by the object from heap memory 114 (Operation 314). Once reclaimed, the program may write other objects to the memory location.

The set of operations further comprises determining whether the object sample is in the priority queue (Operation 316). If the object is not in the priority queue, then no updates to the priority queue are needed and the process may end.

If the object sample is in the priority queue, then the process removes the sample from the queue and distributes the allocation span to neighboring objects in the queue (Operation 318). Distributing the allocation span may include adding the allocation span for the removed object to the allocation span for the object that was allocated immediately before and/or after the object that are in the queue. Distributing the allocation span helps ensure the samples are evenly distributed such that older objects are not pushed out of the queue.

After the allocation span has been distributed, the priority queue is re-sorted based on the updated allocation span (Operation 320). The neighboring objects to the removed object will have an increased allocation span as a result of the distribution. Thus, the objects may be bumped up in the queue priority depending on the allocation span of other objects that are ahead in the queue.

FIG. 4 illustrates example time progression 400 of a queue that tracks objects on the heap during program runtime, in accordance with one or more embodiments. In the example illustrated, a fixed size priority queue with four slots (S1, S2, S3, and S4) is used. The size of the priority queue has been reduced from a preferred implementation (which may include 256 or more slots) to more easily illustrate the events that are triggered when the queue is full. With a larger queue size and more allocation samples, more leaking instances may be profiled, and some of the tracked object may be from program start (e.g., static objects).

Referring to FIG. 4, seven objects are sampled as follows:
Object A: A static object allocated at program start
Object B: A source of a memory leak
Object C: A short-lived object that does not fit inside a TLAB
Object D: A short-lived object
Object E: A source of a memory leak
Object F: A short lived object that does not fit inside a TLAB
Object G: A short-lived object:
Object H: A large object that causes the program to exit due to out-of-memory fault The priority for each object is determined by allocation span. In cases where objects are allocated from a TLAB, the allocation span for a new object is the size of the TLAB. In cases where the object does not fit in a TLAB, the allocation span is the size of the object.

Time progression 400 illustrates the state of a priority queue at various points in time, corresponding to new object allocations/samples and two garbage collection events. These times are summarized as follows:

At time T0, the program starts and the priority queue is empty.

At time T1, a new object (Object A) is allocated and placed first in the queue.

At time T2, a new object (Object B) is allocated and placed in the queue. Object B covers less allocation span than Object A and, therefore, is initially given lower priority in the queue.

At time T3, a new object (Object C) is allocated and placed in the queue. Object C is too large to fit in the TLAB. Thus, the object size is used to determine the allocation span. Object C has a greater allocation span than Object B but less than Object A. As a result, Object C occupies slot S2.

At time T4, garbage collection event G1 occurs, resulting in Object C being removed. Object C spreads allocation span to object B, which is the only neighbor (Object B was allocated before Object C—no objects on the queue were allocated after Object C).

At time T5, a new object (Object D) is allocated and places on the queue in slot S3.

At time T6, a new object (Object E) is allocated and placed on the queue in slot S4. Object E has the same size as Object D but was allocated after Object D and is, therefore, assigned a lower priority.

At time T7, a new object (Object F) is allocated. At this time, the priority queue is full. Since Object F has less allocation span than all the objects in the queue, Object F is not added.

At time T8, a new object (Object G) is allocated. Again the queue is full. However, Object G has a greater allocation span than Object E and, therefore, replaces Object E in slot S4 of the queue.

At time T9, a second garbage collection event G2 occurs, resulting in Object D and Object G being removed. Object D distributes its allocation span to Object G and B. Object G then distributes the allocation to Object B. As a result, Object B passes Object A in priority and is moved to the front of the priority queue.

At time T10, Object H triggers an out-of-memory fault. Object B, which corresponds to a memory leak, is the highest priority item in the queue. Object E, which corresponds to a memory leak was lost at time T8 due to the size of the queue. However, a larger queue size would have captured this memory leak as well.

5. Profiling Memory Leaks

Once recording has finished, a memory leak profile may be generated and presented to an end user. The memory leak profile may highlight the highest priority objects, as determined from the priority queue, as well as the sample information collected for these objects. For example, the memory leak profile may identify the allocation times, stack traces, and object descriptions for each object in the queue. In addition, the memory leak profile may link the allocation-time information with information obtained at or around the time of the recording dump. This information may include, but is not limited, to which objects are currently active/live on heap memory 114 and paths from each object to a root. A user may navigate the profile to quickly isolate and correct the identify memory leaks. For example, the underlying source code may be updated, either automatically or by the user, to prevent future memory leaks. As another example, one or more objects causing a memory leak may be removed from heap memory 114 to reclaim memory space.

Figure 5:
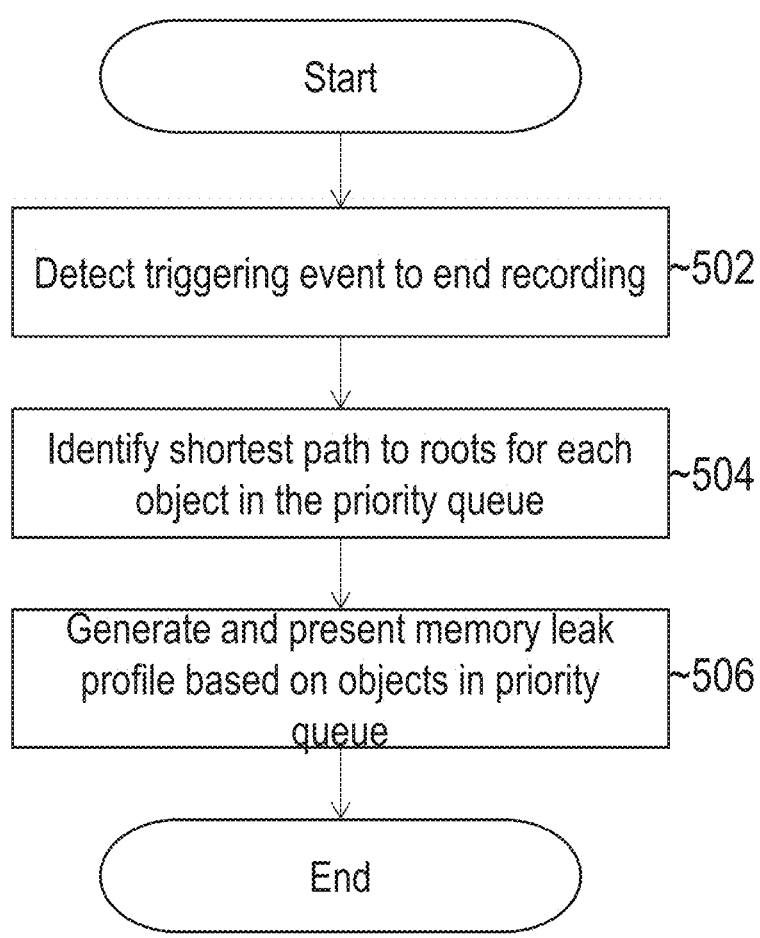
FIG. 5 illustrates an example set of operations for profiling memory leaks, in accordance with one or more embodiments.

FIG. 5 illustrates an example set of operations for handling sampled objects for a runtime recording, in accordance with one or more embodiments. The set of operations includes detecting a triggering event that dumps a runtime recording (Operation 502). The triggering event may vary from implementation to implementation. For example, a runtime recording may be scheduled to run for a predetermined amount of time. As another example, a runtime recording may be dumped on demand in response to a request to a request from a user. In yet another example, a recording may dump due to memory utilization reaching a threshold level, which may cause an out-of-memory fault. In other embodiments, a runtime recording may be dumped when the live set increases for sustained period of time. The live set is the number of reachable objects after a garbage collection (or the memory these objects consume). If that value keeps increasing, a memory leak is likely and dumping out data for further analysis may be helpful.

Responsive to the triggering event, the process identifies, for each object in the priority queue, a path to a root (Operation 504). A root in this context is the highest level in a memory stack from which an object can be referenced. The roots may correspond to active threads, loaded classes, and/or other garbage collection roots at the time of the triggering event. In one or more embodiments, the path is identified by performing a breadth-first search to identify the shortest path to a garbage collection root. The shortest path in this context refers to the shortest reference chain from the object to the root. In other cases, a depth-first search may be performed, which may not return the shortest path to the root. If it is determined that too much memory is used for storing back pointers to reconstruct the path, then the depth-first search may use a stack and pop back pointers in sub-graphs that have been explored to reduce the memory overhead.

The set of operations further comprises generating a memory leak profile based on the objects in the priority queue (Operation 506). A memory profile may be generated and presented as an interactive interface through which the users may navigate through different visualizations and levels of data to quickly isolate when and where memory leaks occurred within the program. Example memory leak profiles, including interfaces and visualization are described further below.

Figure 6A:
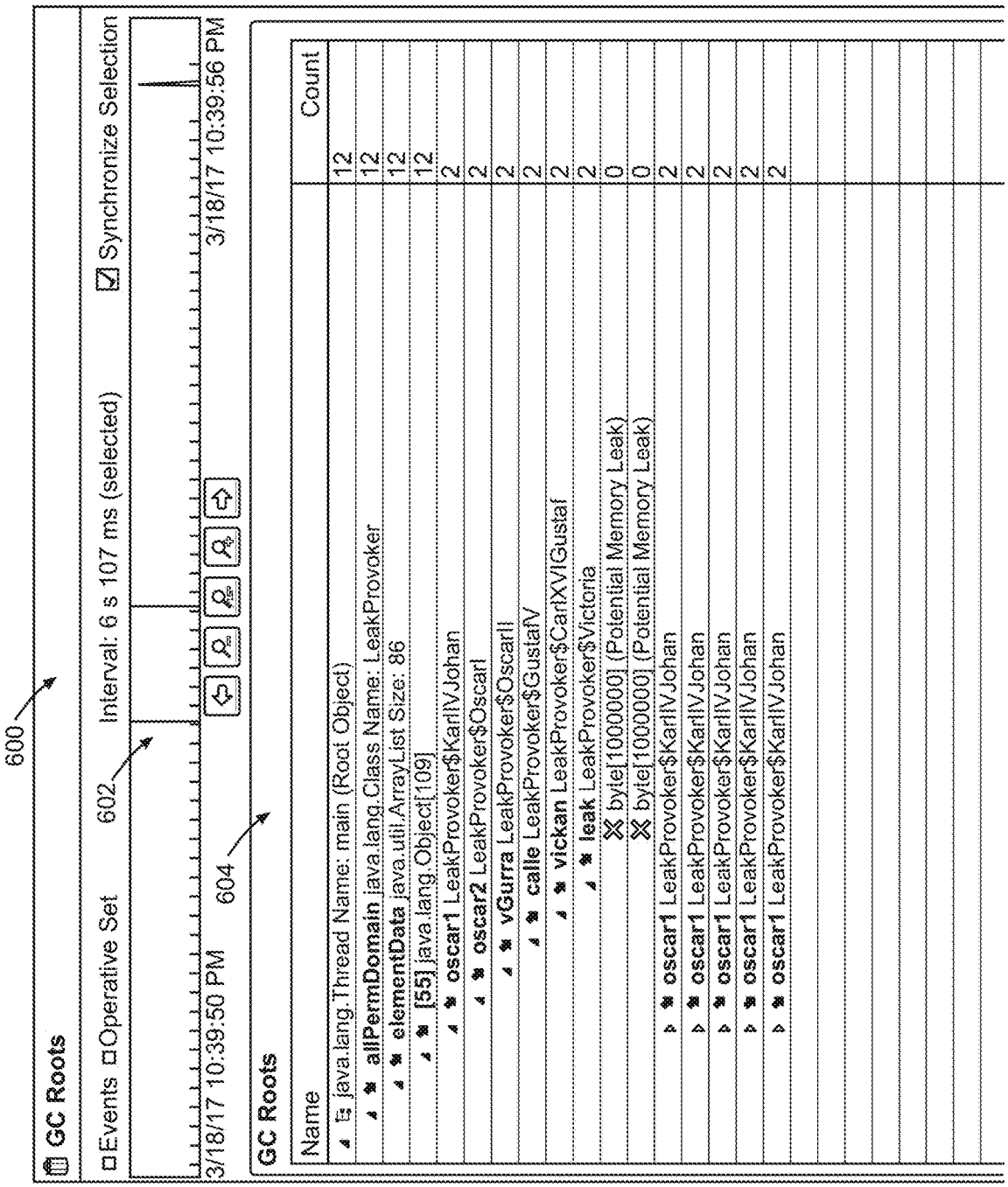
FIG. 6A illustrates an example interface for navigating and visualizing reference chains from potential memory leaks to roots of the potential memory leaks, in accordance with one or more embodiments.
Figure 6B:
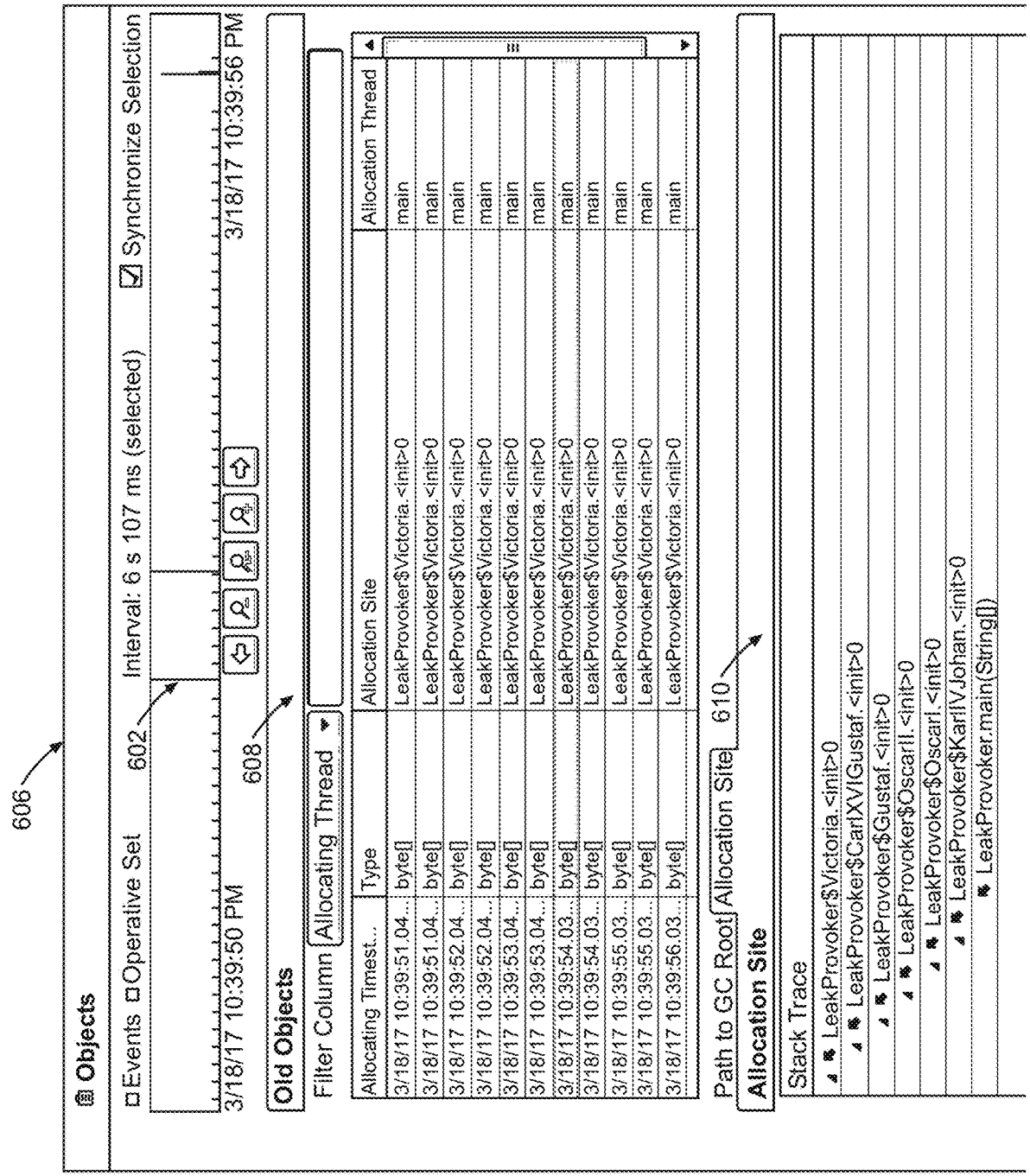
FIG. 6B illustrates an example interface for navigating and visualizing stack traces associated with potential memory leaks, in accordance with one or more embodiments.
Figure 6C:
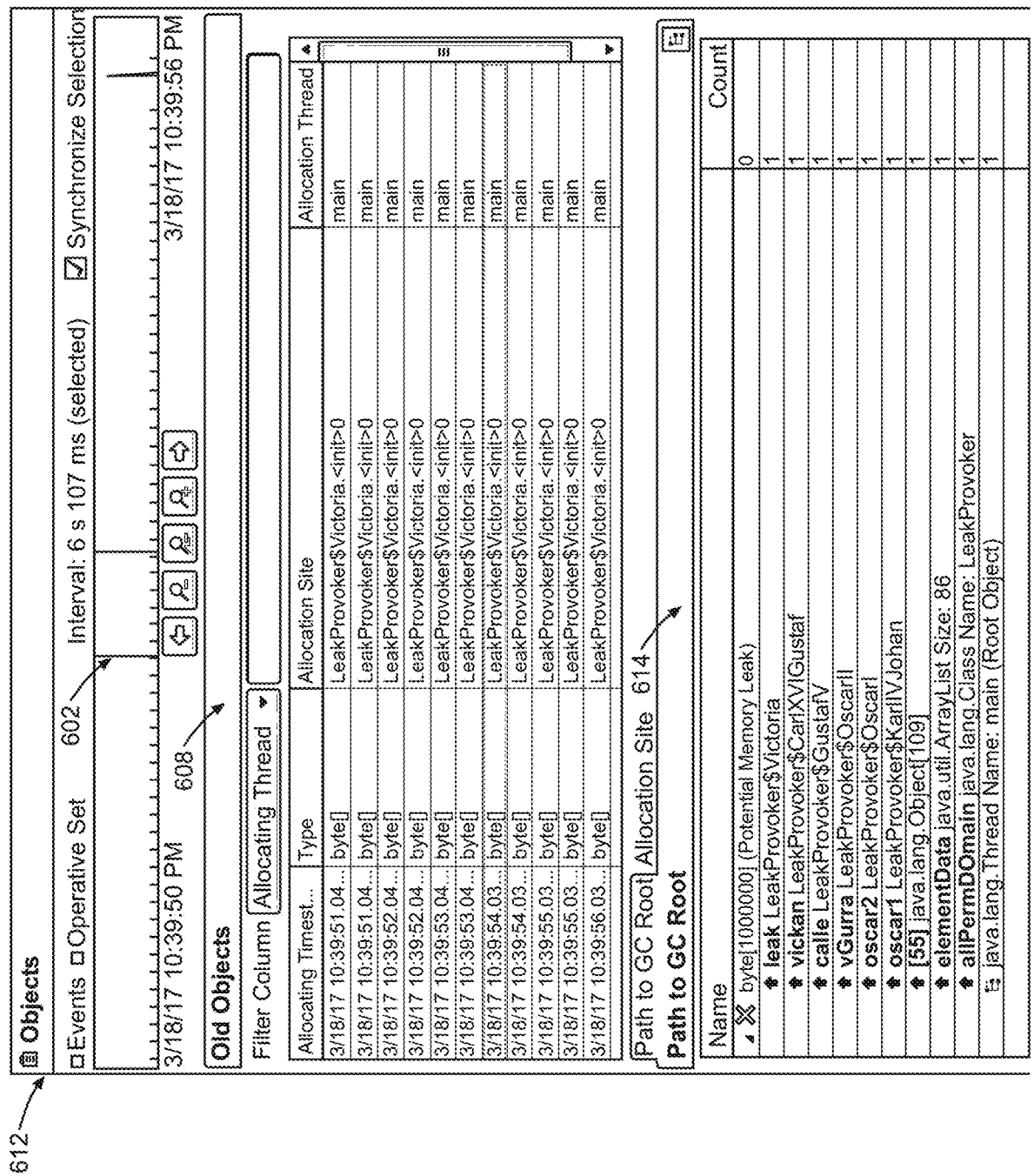
FIG. 6C illustrates an example interface for navigating between different objects and visualizing a path from an object to a root.

FIGS. 6A-C illustrate different visualizations that may be generated for a memory leak profile, in accordance with one or more embodiments. The interfaces and visualization may leverage the timing information obtained from the object samples. The timing information may be used to create an allocation timeline, to identify which objects have been in heap memory 114 the longest and the exact time of allocation. This information may be particularly useful to pinpoint when and where the source of a memory leak occurred.

Referring to FIG. 6A, interface 600 presents the shortest paths from the garbage collection roots to the potential memory leaks. Timeline 602 allows a user to navigate to a particular interval/range of time that is of interest. When a user selects a particular time interval, the displayed profile results may be restricted to objects that were allocated during the selected time interval. These objects may be identified based on the associated allocation timestamps for the sample records. The user may move, expand, or otherwise adjust the selected range to analyze the contents of heap memory 114 at different points in time. Display window 604 presents the GC roots and corresponding reference chains for each object in the priority queue allocated within the selected time window.

Referring to FIG. 6B visualization 606 presents objects allocated within selected time interval 602 in window 608. A user may select an object from window 608 to view a corresponding stack trace in window 610. The stack trace identifies the chain of functions and instruction that led to the object allocation/potential memory leak.

FIG. 6C illustrates visualization 612, which also presents object allocated within selected interval 602 in window 608. The user may navigate to a different pane in window 614 to view the path from the selected object to a GC root. This view allows the user to identify the thread where the allocation occurred and the shortest reference chain through which the object may be accessed by the program. The chain may further identify relationships between a memory leak and other objects in heap memory 114. For example, the source of a memory leak may be from a node of a hashed table or some other object.

The different visual interfaces may be linked based on the collected allocation-time information and object information collected after the potential memory leak is detected. For example, the allocation-time information and the information collected post-detection of a memory leak may be linked by common object information, such as an object name, and/or other attributes. The interfaces may provide links to efficiently navigate these links. For example, the links between the different data sets may be used to generate hyperlinks in the interfaces, which may be clicked on or otherwise selected to navigate between the different visualizations illustrated above. For example, the user may select a hyperlink from visualization 600 to view the stack trace in visualization 606 for the highlighted object. The user may select another hyperlink, either from visualization 600 or 606 to jump to visualization 612 to view the GC roots for the highlighted object. Selected time interval 602 may maintain constant during this time unless the user selects a new timeframe to analyze.

The visual interfaces may additionally or alternatively provide links for facilitating corrective actions with regard to a detected memory leak. For example, the stack trace in window 610 may be linked to a source code file. Upon selecting a particular function, the user may be taken to the linked portion of the source code file. In one or more embodiments, the portion of the source code file is presented through a source code editor, thereby allowing the user to analyze and modify the code. For instance, the user may add instructions to delete or deallocate an object.

As another example, one or more of the interfaces may provide an option to free an object from memory. If a user selects the option, then the object may be deleted from the heap, thereby clearing up memory space. The memory area may then be allocated for other objects during application runtime.

In other cases, one or more of the corrective actions previously mentioned may be implemented automatically via a memory profiling tool. For example, the memory profiling tool may determine the object that is most likely the cause of the memory leak, which may be determined as the highest priority object in the priority queue. This object may then be freed from memory during program runtime.

In one or more embodiments, the contents/data payload of an object may be omitted or otherwise prevented from being viewed. This prevents sensitive user data resolving memory leaks, from being inadvertently displayed/accessed by a developer. In addition, the developer does not have to sift through this type of data, which is generally not useful for resolving memory leaks, instead focusing on the highest-priority objects in the queue.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   for each respective object of a sample of objects, as space is allocated for the respective object:
     storing, in a priority queue, a set of allocation-time information including a timestamp that identifies a time associated with an allocation on a memory store for the respective object;
     performing a stack trace identifying at least one subroutine that triggered the allocation on the memory store; and
     storing, in the allocation-time information, information that identifies the at least one subroutine that triggered the allocation on the memory store;
     wherein priority in the priority queue is determined based at least in part on an allocation span since a last object was added to the memory store;
   replacing allocation-time information of at least a first object in the sample of objects having a lowest priority in the priority queue with allocation-time information for a newly allocated object;
   responsive to automatically detecting a potential memory leak, generating memory leak profile data for at least a second object in the sample of objects; wherein the memory leak profile data identifies:
     based on the allocation-time information, when the allocation on the memory store for at least the second object was performed; and
     based on information obtained after the time of the potential memory leak, identifying information about objects that remained live after the potential memory leak is detected.

2. The method of claim 1, wherein priority in the priority queue is further determined based at least in part on an allocation time.

3. The method of claim 2, further comprising: detecting a new allocation from the memory store for a particular object; responsive to detecting the new allocation, determining whether to add sample information for the particular object to the priority queue based at least in part on an allocation span and an allocation time associated with the new allocation; responsive to determining to add the sample information for the particular object to the priority queue, replacing sample information for at least one other object of the sample of objects with the sample information for the particular object.

4. The method of claim 1, where the set of allocation-time information for each object of the sample of objects further includes a thread identifier that identifies a thread for which the allocation on the memory store was performed and a memory address that identifies a memory location within the memory store where the object is stored.

5. The method of claim 1, further comprising: responsive to automatically detecting the potential memory leak, identifying, for each respective object of the sample of objects, a path from the respective object to a root through which the object is accessible; wherein the memory leak profile data includes the path for at least the second object.

6. The method of claim 5, wherein generating the memory leak profile data comprises generating an interface that allows a user to navigate a reference chain for at least the second object to a respective root.

7. The method of claim 1, wherein generating the memory leak profile data comprises generating an interface that allows a user to navigate between different call stacks associated with a plurality of objects in the sample of objects.

8. The method of claim 1, wherein the memory leak profile data does not include data payloads stored in any object on the memory store to maintain privacy of the data payloads.

9. The method of claim 1, wherein detecting the potential memory leak comprises detecting that memory utilization within the memory store has exceeded a threshold; the method further comprising freeing at least the second object from the memory store.

10. The method of claim 1, wherein generating the memory leak profile comprises generating an interface that allows a user to select a window of time; responsive to receiving a selection of the window of time, presenting, through the interface, a set of allocation information for objects that were stored in the memory store during the selected window of time.

11. One or more non-transitory computer-readable media storing instructions, which, when executed by one or more hardware processors, cause operations comprising:
for each respective object of a sample of objects, as space is allocated for the respective object:
storing, in a priority queue, a set of allocation-time information including a timestamp that identifies a time associated with an allocation on a memory store for the respective object;
performing a stack trace identifying at least one subroutine that triggered the allocation on the memory store; and
storing, in the allocation-time information, information that identifies the at least one subroutine that triggered the allocation on the memory store;
wherein priority in the priority queue is determined based at least in part on an allocation span since a last object was added to the memory store;
replacing allocation-time information of at least a first object in the sample of objects having a lowest priority in the priority queue with allocation-time information for a newly allocated object;
responsive to automatically detecting a potential memory leak, generating memory leak profile data for at least a second object in the sample of objects; wherein the memory leak profile data identifies:
based on the allocation-time information, when the allocation on the memory store for at least the second object was performed; and
based on information obtained after the time of the potential memory leak, identifying information about objects that remained live after the potential memory leak is detected.

12. The one or more non-transitory computer-readable media of claim 11, wherein priority in the priority queue is further determined based at least in part on one of an allocation span or an allocation time.

13. The one or more non-transitory computer-readable media of claim 12, wherein the instructions further cause operations comprising: detecting a new allocation from the memory store for a particular object; responsive to detecting the new allocation, determining whether to add sample information for the particular object to the priority queue based at least in part on an allocation span and an allocation time associated with the new allocation; responsive to determining to add the sample information for the particular object to the priority queue, replacing sample information for at least one other object of the sample of objects with the sample information for the particular object.

14. The one or more non-transitory computer-readable media of claim 11, where the set of allocation-time information for each object of the sample of objects further includes a thread identifier that identifies a thread for which the allocation on the memory store was performed and a memory address that identifies a memory location within the memory store where the object is stored.

15. The one or more non-transitory computer-readable media of claim 11, wherein the instructions further cause operations comprising: responsive to automatically detecting the potential memory leak, identifying, for each respective object of the sample of objects, a path from the respective object to a root through which the object is accessible; wherein the memory leak profile data includes the path for at least the second object.

16. The one or more non-transitory computer-readable media of claim 15, wherein generating the memory leak profile data comprises generating an interface that allows a user to navigate a reference chain for at least the second object to a respective root.

17. The one or more non-transitory computer-readable media of claim 11, wherein generating the memory leak profile data comprises generating an interface that allows a user to navigate between different call stacks associated with a plurality of objects in the sample of objects.

18. The one or more non-transitory computer-readable media of claim 11, wherein the memory leak profile data does not include data payloads stored in any object on the memory store to maintain privacy of the data payloads.

19. The one or more non-transitory computer-readable media of claim 11, wherein detecting the potential memory leak comprises detecting that memory utilization within the memory store has exceeded a threshold; wherein the instructions further cause operations comprising freeing at least the second object from the memory store.

20. The one or more non-transitory computer-readable media of claim 11, wherein generating the memory leak profile comprises generating an interface that allows a user to select a window of time; responsive to receiving a selection of the window of time, presenting, through the interface, a set of allocation information for objects that were stored in the memory store during the selected window of time.

\* \* \* \* \*